(12) United States Patent
Breeden et al.

(10) Patent No.: US 9,193,295 B2
(45) Date of Patent: Nov. 24, 2015

(54) SEPARATE STRAP STORAGE IN A RATCHET ARRANGEMENT

(75) Inventors: Winston Breeden, Chagrin Falls, OH (US); Robert Johnson, Montville, OH (US); Robert Schmidt, Painesville, OH (US)

(73) Assignee: Winston Products LLC, Cleveland, OH (US)

( * ) Notice: Subject to any disclaimer, the term of this patent is extended or adjusted under 35 U.S.C. 154(b) by 1354 days.

(21) Appl. No.: 12/644,484

(22) Filed: Dec. 22, 2009

(65) Prior Publication Data

US 2010/0175233 A1 Jul. 15, 2010

Related U.S. Application Data

(60) Provisional application No. 61/139,823, filed on Dec. 22, 2008.

(51) Int. Cl.
*B65H 75/48* (2006.01)
*A44B 11/25* (2006.01)
*A44B 11/28* (2006.01)
*B60P 7/08* (2006.01)

(52) U.S. Cl.
CPC ............ *B60P 7/0846* (2013.01); *Y10T 24/2175* (2015.01)

(58) Field of Classification Search
CPC .......................... B60P 7/0846; Y10T 24/2175
USPC ..... 24/68 CD, 68 A, 68 BT, 68 D, 68 E, 68 F, 24/68 PP, 68 SC, 68 R, 68 T, 69 CF, 69 CT, 24/69 R, 69 ST, 69 TM, 69 TS, 70 R, 70 ST, 24/71 R, 71 ST, 71 T, 71 TD, 71.1; 242/371; 254/217, 218
IPC ......................................................... B65H 75/48
See application file for complete search history.

(56) References Cited

U.S. PATENT DOCUMENTS

| | | | |
|---|---|---|---|
| 5,611,520 A * | 3/1997 | Soderstrom | 254/218 |
| 6,102,371 A * | 8/2000 | Wyers | 254/218 |
| 6,609,275 B1 * | 8/2003 | Lin | 24/68 CD |
| 2001/0045548 A1 | 11/2001 | Landy | |
| 2003/0093884 A1 | 5/2003 | Doty | |
| 2006/0188354 A1 | 8/2006 | Bosley | |
| 2006/0197072 A1 | 9/2006 | Huang | |

OTHER PUBLICATIONS

International Search Report dated Jul. 29, 2010.

* cited by examiner

*Primary Examiner* — Robert J Sandy
*Assistant Examiner* — Louis Mercado
(74) *Attorney, Agent, or Firm* — Cooper Legal Group LLC

(57) ABSTRACT

A storage device within a ratchet arrangement for automatically storing a length of fastening material including a storage housing and a biasing member for drawing the fastening material into the storage housing. The fastening material can be used with a ratchet/handle tie-down mechanism, allowing for the dynamic portion of the webbing to automatically be retracted into the storage housing. The automatic retraction leaves little or no excess webbing or fastening material, such that a user does not have to tie off excess webbing or material.

16 Claims, 9 Drawing Sheets

SEPARATE STRAP STORAGE IN A RATCHET ARRANGEMENT

CROSS-REFERENCE TO RELATED APPLICATIONS

This application claims the benefit of the filing date of U.S. Provisional patent application Ser. No. 61/139,823 filed on Dec. 22, 2008, the disclosure of which is incorporated herein by reference.

BACKGROUND OF THE INVENTION

The invention relates to the storage of excess fastening material in a ratchet or cambuckle tie down system.

Ratchet and cambuckle tie downs are used for securing various types of cargo, usually while in transit. Some examples of what they might tie down include ATV's, Motorcycles, Furniture, Tools, etc.

Standard ratchets generally have two lengths of webbing. A first length of webbing is fixed webbing that is fixedly attached to one end of a ratchet body (i.e., a static webbing). Another length of webbing, referred to herein as dynamic webbing, may be attached to an axle or spool. In turn, the axle or spool is connected to one or more toothed ratchet wheels. Upon engagement of a lever with the toothed wheel and actuation of the lever, the axle or spool is rotated and thus coils the dynamic webbing onto the axle or spool.

With the standard ratchet, when a consumer is done securing the cargo with a tie down, there is an excess of webbing that hangs off the tie down. Loose ends of this excess webbing may flap in the wind during transit, may be noisy, and can cause damage to the vehicle or cargo.

It would be useful to provide a storage device for storing the excess webbing that overcomes one or more of the above shortcomings.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with one aspect the present invention provides a ratchet arrangement including storage for storing a length of material. The ratchet arrangement includes a length of fastening material having a first end and a second end, at least one attachment means for attachment between the fastening material and an item to be secured, a ratchet actuatable for tightening the fastening material and a storage assembly for storing a length of the fastening material. The assembly includes a storage housing having an internal cavity. The storage housing has an opening between the internal cavity and the exterior of the storage housing. The assembly includes a spool mounted within the internal cavity of the storage housing, a biasing member mounted within the internal cavity of the storage housing and operatively attached to the spool, and a fastening material having a first end and a second end. The first end of the fastening material is attached at the spool. The second end of the fastening material extends through the opening in the storage housing. The fastening material is adapted to be unwound from the spool when the spool is rotated in a first direction and wound onto the spool when the spool is rotated in a second direction opposite to the first direction. The biasing member is adapted to bias the spool in the second direction. Rotation of the spool in the first direction causes the fastening material to extend from the opening.

In accordance with another aspect the present invention provides a ratchet arrangement that includes storage for storing a length of material. The ratchet arrangement includes a tie-down assembly that has a ratcheting mechanism and a buckle. The ratcheting mechanism is movably attached to the buckle. The ratchet arrangement includes a length of webbing having a first end and a second end. The webbing is attached adjacent its first end at an object and adapted to be secured adjacent its second end at the buckle. The ratchet arrangement includes a storage housing separate from the tie-down assembly having a biasing member mounted within the storage housing and a fastening material that has a first end and a second end. The first end of the fastening material is attached within the storage housing. The second end of the fastening material extends through the ratcheting mechanism and buckle. The biasing member retracts the fastening material into the storage housing.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
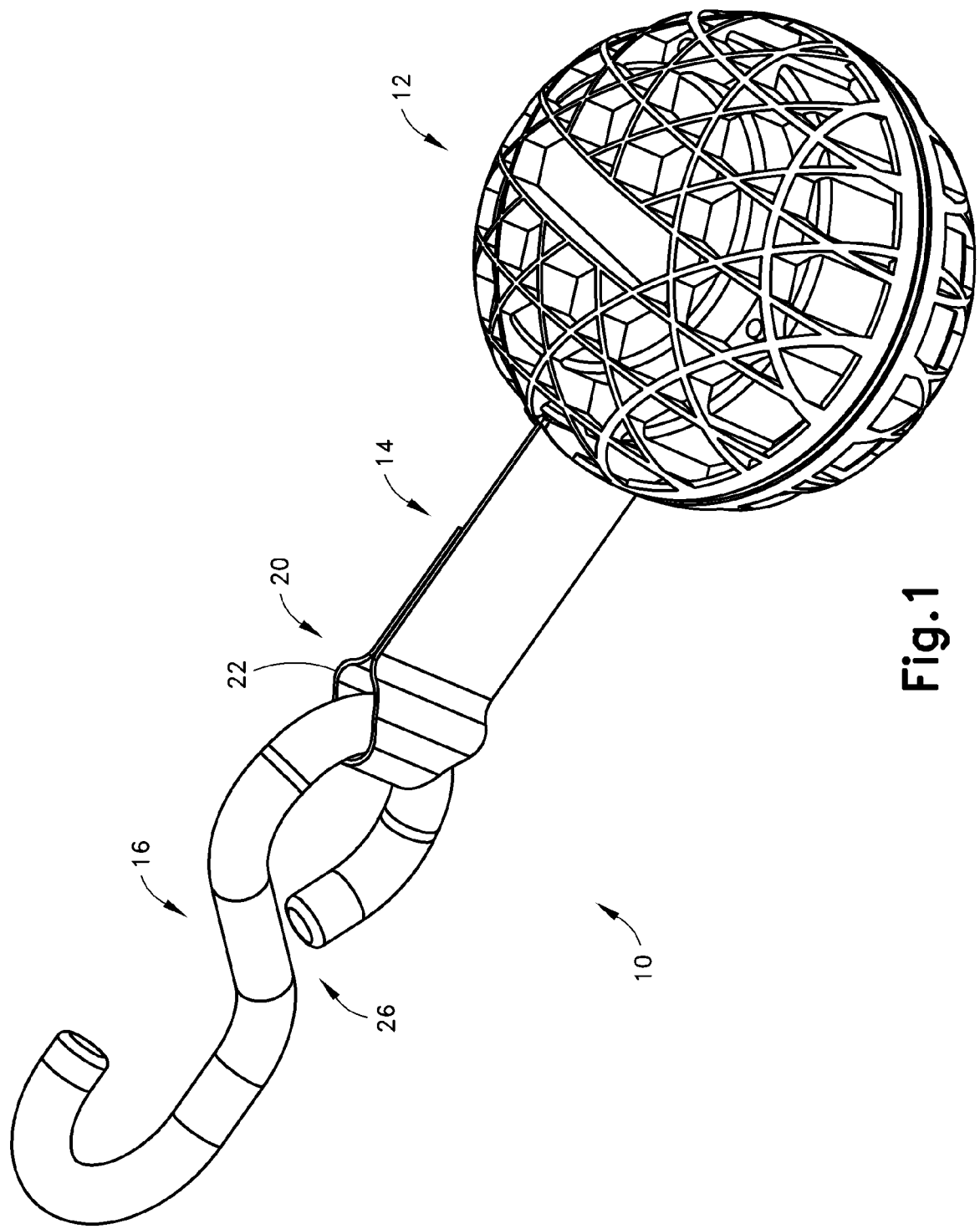
FIG. 1 is a perspective view of one embodiment of the storage assembly of the invention.

FIG. 1 of the drawings illustrates a storage assembly 10 in accordance with an embodiment of the present invention. The storage assembly 10, referred to in one commercial embodiment as a "SMART BALL," includes a storage housing 12 and a fastening material 14 extending from the storage housing 12. The fastening material 14 may include a first end 18 (shown in FIG. 5) and a second end 20 (shown in FIG. 1). The second end 20 of the fastening material 14 may be provided with a loop end 22, or the like, allowing for the second end 20 to be fastened to an attachment means 16.

In the shown embodiment, the attachment means 16 comprises a hook attached to the second end 20, however, other attachment means are envisioned. For instance, other possible attachment means 16 include fasteners, clips, pins, clamps, etc. Similarly, multiple types of hooks and/or hook shapes may be used, such as S-shaped hooks (shown), fish hooks, grab hooks, etc. Even further, clasps or other structure (not shown) for connection may be used. The attachment means 16 may be removably or non-removably attached to the loop end 22. The hook may further include a slot 26 allowing for a consumer to feed the loop end 22 of the second end 20 of the fastening material 14 through the slot 26, thus removably securing the fastening material 14 to the attachment means 16.

Figure 2:
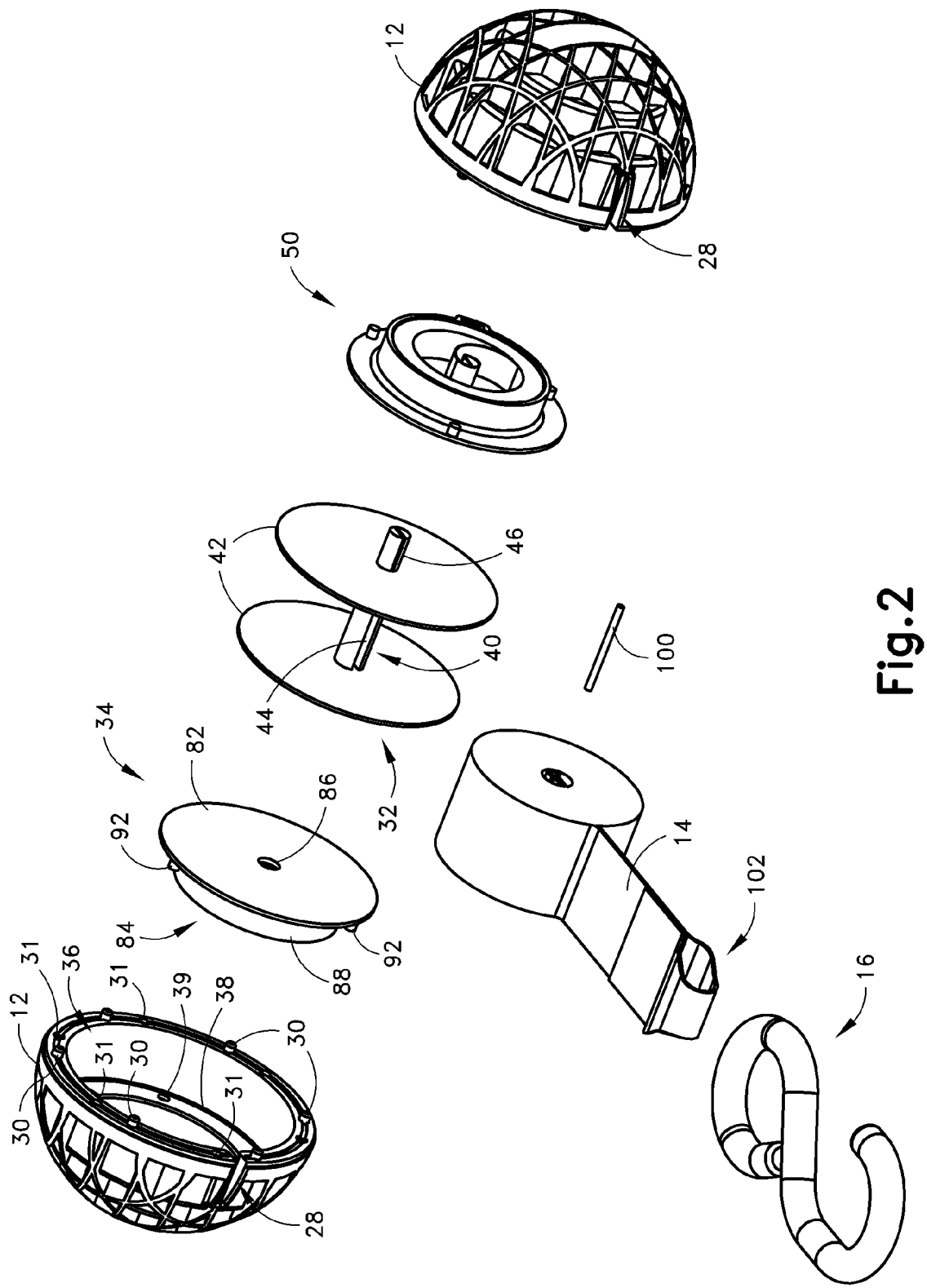
FIG. 2 is an exploded view of the embodiment of the invention shown in FIG. 1.

Referring now to FIG. 2, the storage housing 12 may comprise a cylindrical shell that can be formed of two halves. However, other possible configurations are envisioned, such as two halves that may be either removably or non-removably coupled together, a plurality of pieces that fit together to form the storage housing, a single piece, etc. If the storage housing 12 is formed of more than one piece, a number of fastening means may be used to hold the storage housing together, such as adhesives, welding, mechanical fasteners, hook-and-loop fasteners, etc. Any or all of the storage housing 12 can also be partially or completely covered by a protective coating, covering, etc., such as a material having a relatively low durometer value (i.e., a relatively soft material), so as to provide protection to any or all of the storage housing, ratchet tie-down, item to be secured (cargo, ATV, motorcycle, etc.), or securing structure (i.e., ground, truck bed, trunk, etc.). The coating or covering can also be removably or non-removably attached in various manners, including over-molding, adhesives, welding, mechanical fasteners, hook-and-loop fasteners, etc. Either or both of the storage housing 12 and coating/covering can include various indicia for various purposes.

The storage housing 12 may be made of a number of materials, including, but not limited to, a hard plastic, a metal, a rubber, etc. Similarly, the storage housing 12 may be formed from a combination of the listed materials, for instance a hard plastic covered in rubber. While the storage housing 12 is shown in a cylindrical, spherical, "ball" configuration, the shape may be changed. For instance, example shapes may include a hockey puck shape, an oval football shape, cubes or three dimensional rectangles, pyramids, other three dimensional polygonal shapes, random shapes, etc. Similarly, the storage housing may be painted to match the shape, such as a hockey puck design, a football design, and various sports designs, such as a baseball, basketball, golf, volleyball, etc. may be painted onto a circular shape.

The storage housing 12 may include an opening 28 between an internal cavity 36, positioned inside the storage housing 12, and the exterior of the storage housing 12. The opening 28 in the storage housing 12 can extend along a portion of the length of the storage housing 12. The opening 28 may comprise any number of widths and lengths, depending in part on the type of fastening material used, and is designed to allow for the passage of the fastening material 14. The opening 28 may be formed in either one half of the storage housing 12, or may extend across both halves, as in the shown example of FIG. 2.

Each half of the storage housing 12 may also include a ledge 38 positioned within the internal cavity 36. Each ledge 38 may circle the internal cavity 36 of the storage housing 12. Each ledge 38 may further include one or more apertures 39.

Figure 3:
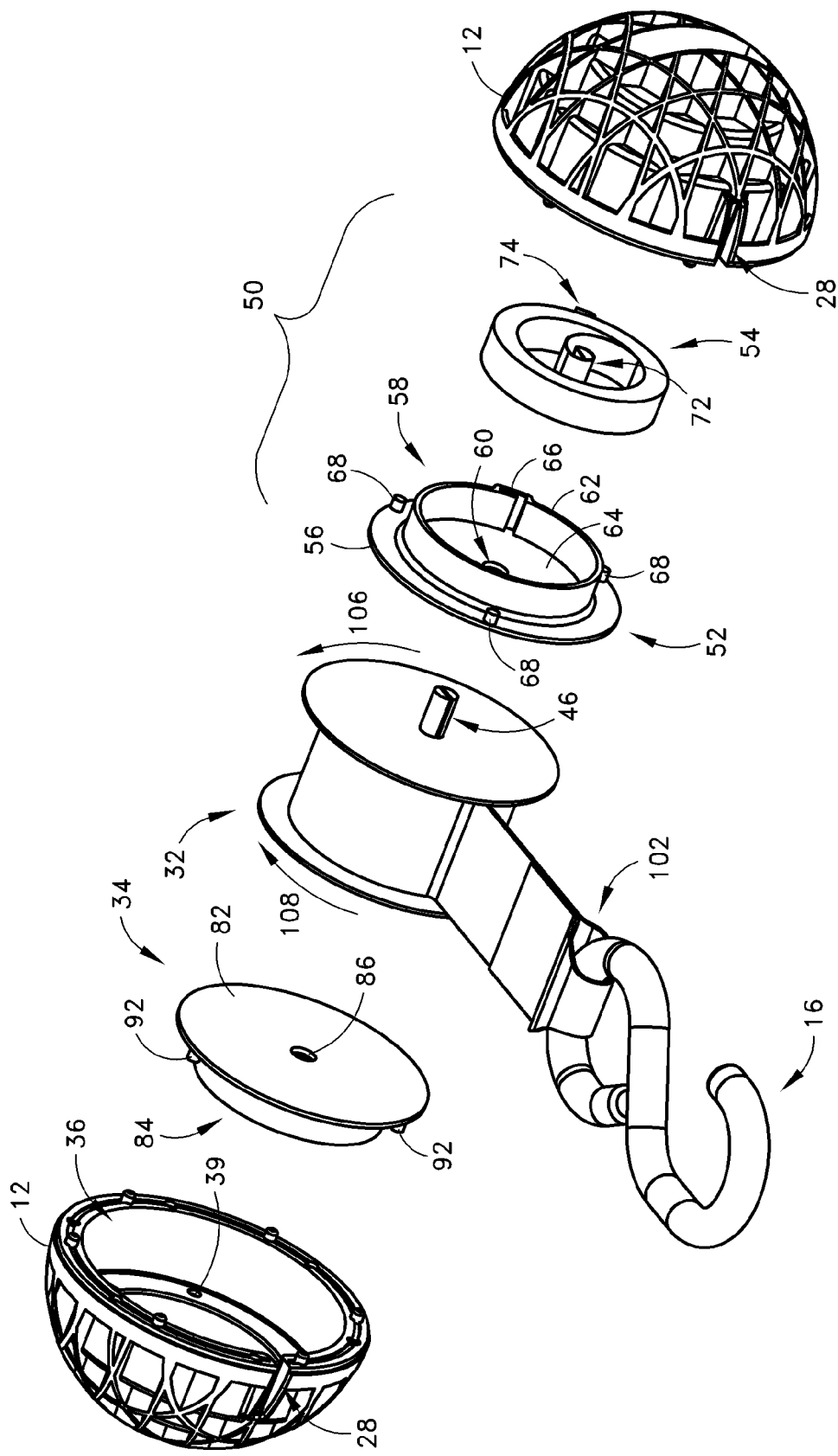
FIG. 3 is a further exploded view of the embodiment of the invention shown in FIG. 1.

As shown in FIGS. 2 and 3, each half of the storage housing 12 may include one or more protrusions 30 formed on an edge 29 of the storage housing 12. The protrusions 30 may be formed integrally with the storage housing 12 or, in the alternative, may comprise additional pieces. The storage housing 12 may also include one or more cavities 31 formed on the edge 29 for receiving the corresponding protrusions 30. Thus, the halves of the storage housing 12 may be brought together such that the edges 29 make contact and face each other. Each protrusion 30 may be aligned with and inserted into a corresponding cavity 31 such that the halves of the storage housing 12 are secured. The protrusions 30 may be sized to be slightly smaller than the cavities 31, such that the engagement between the protrusions 30 and cavities 31 forms a snug fit and limits movement between the halves of the storage housing 12. For instance, rotational movement, sliding, etc. is prevented. It is understood that the present invention is not limited to this example. For instance, more or less protrusions are possible, a locking means may be provided, etc. Similarly, the halves of the storage housing 12 may be permanently secured together as well, such as by adhesives, glue, etc.

The storage assembly 10 may further include a spool 32, a biasing member 50, and a stabilizer 34 positioned within the storage housing in the internal cavity.

The spool 32 may be positioned inside the storage housing 12 in the internal cavity 36. As shown in FIG. 2, the spool 32 may include an axle 40 having two circular discs 42 secured to the axle 40. The axle 40 may protrude through each of the circular discs 42 to form protruding sections 46. The axle 40 may be formed with a channel 44 passing through the center. The channel 44 may pass either partially or completely through the axle 40, such that the channel 44 in the axle 40 forms a longitudinally extending groove or indent in the axle. The channel 44 may be wider between the circular discs 42 than in the protruding sections 46.

The axle 40 and protruding sections 46 may comprise separate elements. For instance, the axle 40 may have a larger diameter and wider channel 44 than the protruding sections. In the shown example, the protruding section has a smaller diameter and narrower channel than the axle 40. In an alternative example, however, the axle 40 may extend through each of the circular discs 42, such that the axle 40 and protruding sections 46 are the same structure.

The biasing member 50 may also be positioned in the internal cavity 36 of the storage housing substantially coaxially with the spool 32 and the stabilizer 34. As seen in FIG. 3, the biasing member 50 may comprise a housing 52 and a torsion spring 54. The housing 52 includes a first side 56 and a second side 58, with the first side 56 facing the spool 32 and the second side 58 facing the storage housing 12. The first side 56 of the housing 52 may be substantially flat. The second side 58 of the housing 52 may include a raised portion 62 with a hollowed interior 64. As will be described in further detail, the outer diameter of the raised portion 62 may be sized to be slightly smaller than the inner diameter of the ledge 38.

The raised portion 62 may further include a retaining space 66. In the shown example, the retaining space 66 is provided on the exterior of the raised portion 62, but may be provided in other locations, such as the interior of the raised portion 62, etc. One or more protrusions 68 may be formed adjacent to and surrounding the raised portion 62. The housing 52 may also include a center-positioned hole 60 passing through the housing 52 and sized to accommodate the axle 40 of the spool 32. Specifically, the protruding section 46 of the axle 40 may pass through the hole 60.

The spring 54 may be positioned within the hollowed interior 64 of the housing 52 substantially coaxially with the spool 32. As shown, the spring 54 may be substantially circular having a hook-like element 72 or catch at an end. The hook-like element 72 or catch may be provided in the center of the spring 54. As seen in FIG. 2, the outer diameter of the spring 54 can be sized such that it fits somewhat closely in the hollowed interior 64 of the housing 52. A retaining clip 74 may be secured to the outer diameter of the spring 54. The retaining clip 74 is sized to fit within the retaining space 66 of the housing 52. Thus, when the spring 54 is positioned within the housing 52, the retaining clip 74 may engage and removably slide into the retaining space 66. The engagement between the retaining clip 74 and retaining space 66 may limit both the rotational and axial movement of the spring 54 with respect to the housing 52.

As shown in FIG. 3, the spring 54 may be removably secured to the spool 32 by engagement between the hook-like element 72 and the channel 44 of the axle protruding section 46. As described above, the hook-like element 72 is formed in the center of the spring 54. The hook-like element 72 may include a substantially flat portion designed to slidably engage the channel 44 of the axle protruding section 46. The axle protruding section 46 may slide through the hole 60 in the housing 52 to engage the hook-like element 72. The substantially flat portion of the hook-like element 72 may be slid into the channel 44 of the axle 40 to form a snug fit between the axle 40 and spring 54.

As described above, the outer diameter of the spring 54 can be sized such that it fits snugly in the space within the hollowed interior 64 of the raised portion 62. In the shown example, the spring 54 is oriented such that when the spring 54 is wound in a first direction 106 (i.e., a counterclockwise direction), additional turns are created in the spring 54 causing the tension in the spring 54 to increase. Conversely, when the spring 54 is wound in a second direction 108 (i.e., a clockwise direction), the tension in the spring decreases. The spring 54 is therefore biased to rotate the axle in the first direction 106, a counterclockwise direction. The engagement between the retaining clip 74 of the spring 54 and retaining space 66 of the raised portion 62 ensures that the spring 54 cannot freely rotate within the hollowed interior 64. The outside of the spring 54 is thus held securely in place. The spring 54 is therefore limited to rotational movement at the end with the hook-like element 72. It is to be understood that the direction of rotation may be reversed, such that the spring may be biased to rotate in the clockwise direction. As will be described in further detail, the outer diameter of the raised portion 62 may be sized to be slightly smaller than the inner diameter of the ledge 38.

The structure of the biasing member 50 is not limited to the structure described above. For instance, the biasing member 50 may comprise a spring 54 without a housing 52. In such a situation, the spring 54 may be directly attached to the spool 32. The spring 54 may alternatively be attached directly to the interior of the storage housing 12. Similarly, the structure of the retaining clip 74 and retaining space 66 may be changed as well. For example, the spring 54 may be attached to the housing 52 by any number of means, such as by adhesives, a locking mechanism, etc.

Referring to FIGS. 2 and 3, the stabilizer 34 may be positioned in the internal cavity 36 of the storage housing 12 substantially coaxially with the spool 32 and biasing member 50. The structure of the stabilizer 34 may be nearly identical to that of the housing 52 of the biasing member 50. For instance, the stabilizer 34 includes a first side 82 and a second side 84. The first side 82 may be substantially flat and oriented to face towards the spool 32. The second side 84 may face the storage housing 12 in the opposite direction of the first side 82. The first side 82 may include a hole 86 sized to accommodate the axle 40 of the spool 32. The hole 86 may pass either partially or completely through the stabilizer. The second side 84 of the stabilizer 34 may include a raised portion 88 with a hollowed interior portion (not shown) identical to that of the housing 52 of the biasing member 50. One or more protrusions 92 may be formed adjacent to the raised portion 88 on the second side 84. The second side 84 may be oriented to face towards the storage housing 12 in the opposite direction of the first side 82.

The stabilizer 34 may further include a second spring (not shown). Since the structure of the stabilizer 34 is substantially similar to that of the housing 52 of the biasing member 50, the second spring may be similar to that of the existing spring 54. For instance, the second spring may be placed in a hollowed interior portion of the stabilizer 34. The second spring may be provided with a retaining clip while the raised portion of the stabilizer may be provided with a retaining space. Similar to the engagement between the spring 54 and housing 52, the retaining clip of the second spring could engage the retaining space of the raised portion, thus ensuring a connection. Further, the second spring may be provided with a hook-like element at an end for attachment to the axle 40. Other embodiments including a second spring are contemplated. For instance, the second spring may be secured to the internal cavity 36 of the storage housing 12. In an embodiment including the second spring, it is complemented that both springs may be biased in the same direction to provide a greater retraction force to the fastening material 14.

Figure 4:
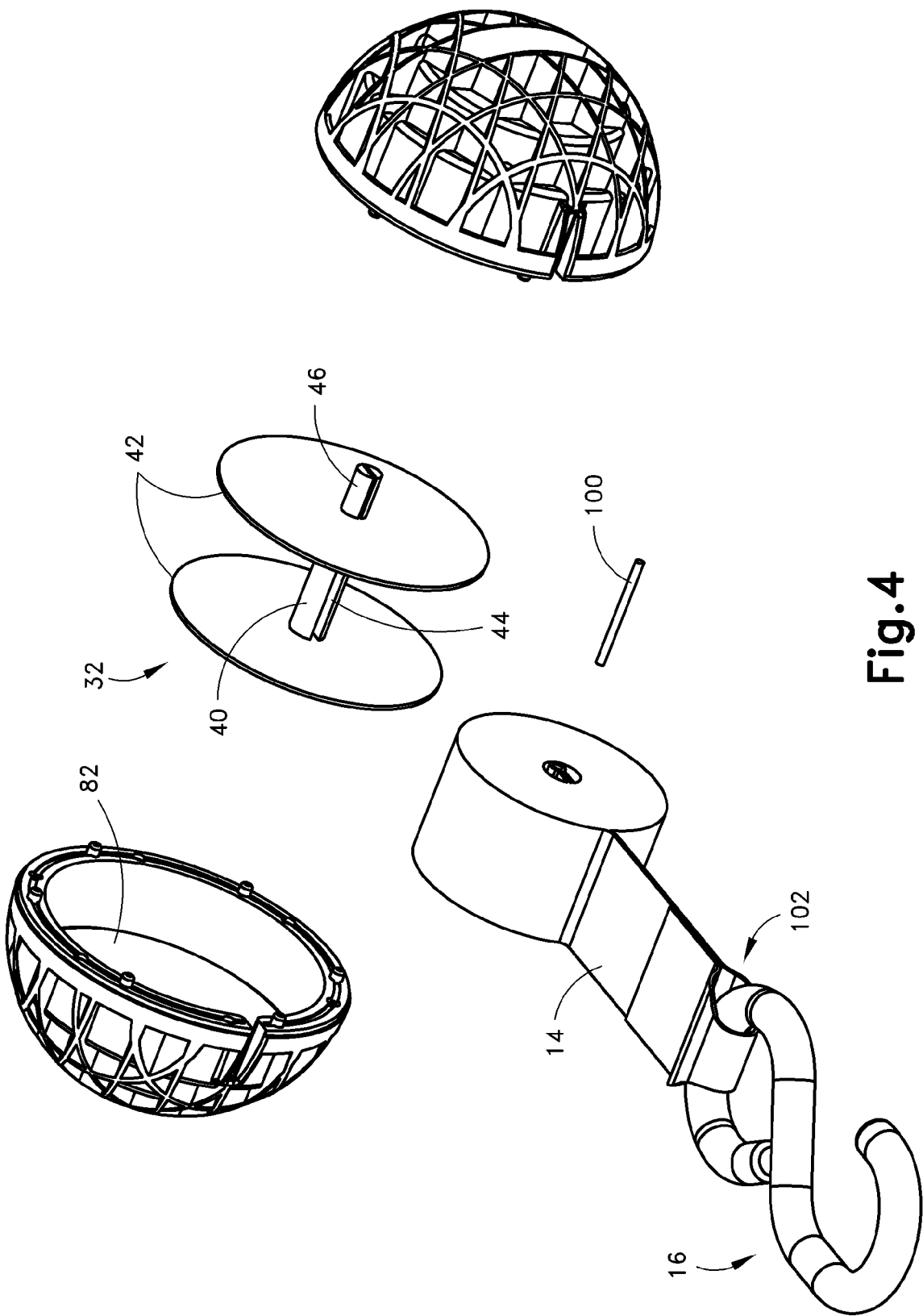
FIG. 4 is an exploded view of the embodiment of the invention shown in FIG. 1 with the stabilizer and biasing member fully inserted into the storage housing.

The spool 32, stabilizer 34, and biasing member 50 may be held in place while positioned within the internal cavity 36 of the storage housing 12. As described above and shown in FIGS. 2 and 3, both the stabilizer 34 and housing 52 of the biasing member 50 may have one or more protrusions 68, 92 that may be positioned around the raised portion 62, 88. Similarly, the ledge 38 of the storage housing 12 may include an equal number of apertures 39 for engaging with the protrusions 68, 92. The inner diameter of each ledge 38 may be slightly larger than the outer diameter of the raised portion 62, 88. Thus, when the halves of the storage housing 12 are closed, the protrusions 68, 92 of both the housing 52 of the biasing member 50 and stabilizer 34 respectively may each engage apertures 39 of corresponding ledges 38. The raised portions 62, 88 are sized to fit within the interior of the ledges 38. Thus, the engagement between the protrusions 68, 92 and apertures 39 limit rotational movement of the stabilizer 34, and biasing member 50 with respect to the storage housing 12. It is to be understood that any number of protrusions and apertures may be provided, as long as rotational movement is limited. FIG. 4 shows the spool 32 and biasing member 50 secured within the storage housing 12.

It is understood that the positioning of the stabilizer 34 and biasing member 50 within the storage housing 12 is merely one example. For instance, a more permanent means, such as an adhesive or a locking mechanism can be used to hold the stabilizer 34 and biasing member 50 in place.

Figure 6:
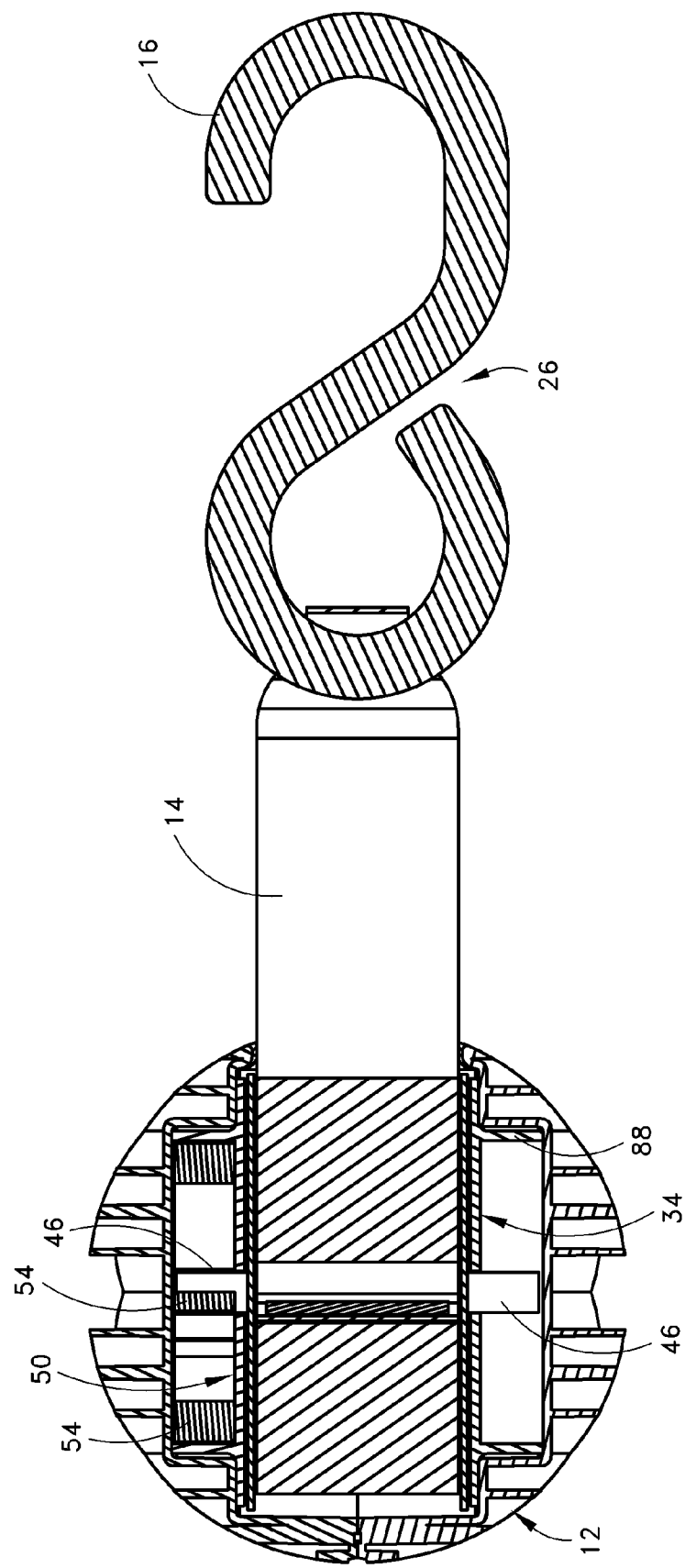
FIG. 6 is a side view of the embodiment of the invention with the fastening material wound onto the spool and showing the attachment of the axle to the biasing member.

As described above, the axle 40 of the spool 32 may protrude through the center of each of the circular discs 42 to form protruding sections 46. Referring briefly to FIG. 6, the protruding section 46 may be inserted into the hole 86 of the stabilizer 34. The diameter of the hole 86 is sized to be slightly larger than the diameter of the axle protruding section 46. Thus, when the axle protruding section 46 is inserted into the hole of the stabilizer 34, the axle 40 may be limited to rotational movement with respect to the stabilizer 34. Movement in the longitudinal direction, or sliding direction is therefore limited.

Figure 5:
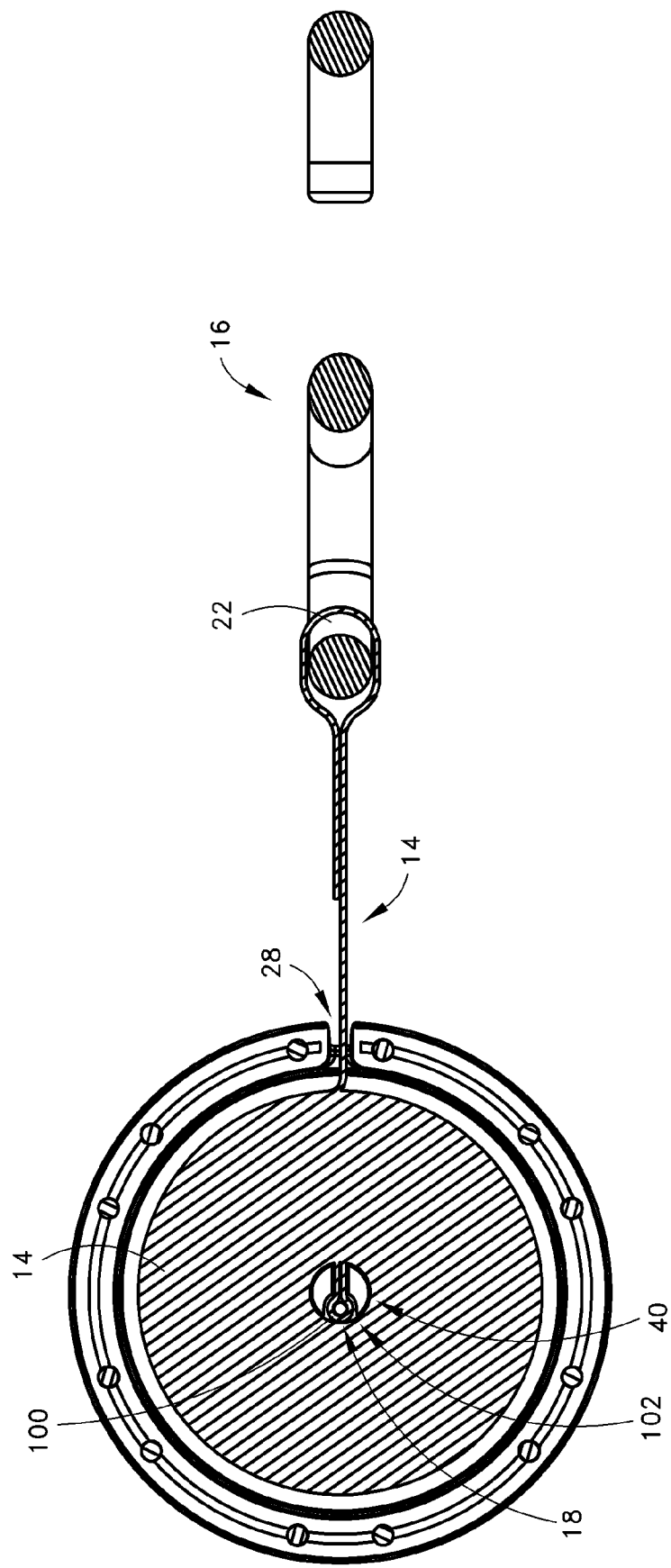
FIG. 5 is a top view of the embodiment of the invention with the fastening material wound onto the spool and showing the attachment of the fastening material to the axle.

As shown in FIG. 5, the storage assembly 10 may be provided with the fastening material 14 wound onto the spool 32. The fastening material 14 may comprise any type of fabric, rope, or the like, and includes the first end 18 and the second end 20. The fastening material 14 may be attached adjacent its first end 18 to the spool 32 and is adapted to be secured adjacent its second end 20 at the attachment means 16. For attaching the fastening material 14 to the spool 32, a dowel-like element 100 may be provided for placement in the channel 44 of the axle 40. In one example, a loop 102 may be provided at the first end 18 of the fastening material 14. The dowel-like element 100 may be removably placed within the loop 102. The loop 102 and dowel-like element 100 may then be positioned within the channel 44 of the axle 40 such that the fastening material 14 passes through the channel 44. The loop 102 and dowel-like element 100 may then be held in place as the remainder of the fastening material 14 is wound onto the axle. Thus, when the fastening material 14 is in a fully unwound position, the fastening material 14 remains attached at its first end 18 to the axle 40.

Other potential attachment means may be used, however. For instance, the first end of the fastening material may be secured directly to the axle, such that the first end remains attached in a fully unwound position. In such a case, the first end may be attached in any number of ways, such as by adhesives, sewing, etc.

Figure 7:
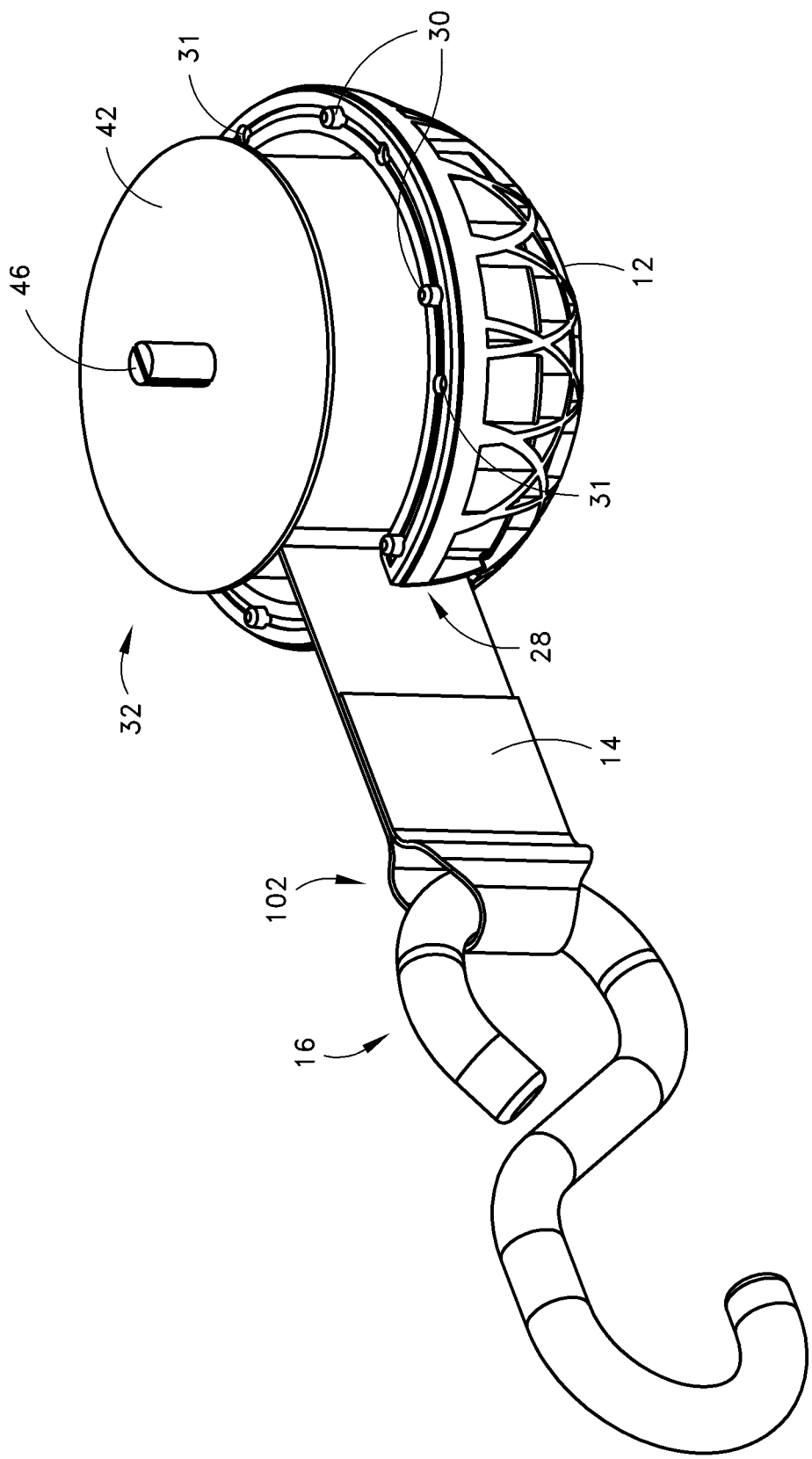
FIG. 7 is a perspective view of the embodiment of the invention shown in FIG. 1 with the fastening material wound onto the spool in a fully retracted position.

The fastening material 14 is adapted to be unwound from the spool 32 when the spool 32 is rotated in a first direction 106 and wound onto the spool 32 when rotated in a second direction 108. FIG. 3 illustrates the opposing first direction 106 and second direction 108. Consequently, in the present example, unwinding occurs when rotating in the counter-clockwise direction, thus the first direction 106. Winding occurs when rotating in the clockwise direction, thus the second direction 108. As described above, however, the directions may be reversed. The fastening material 14 may be fed through the opening 28 prior to closing the halves of the storage housing 12. As seen in FIG. 7, the attachment means 16 secured to the loop end 22 may be larger than the opening 28 in the storage housing 12. Thus, the second end 20 of the fastening material 14 is prevented from being completely retracted into the storage housing 12. In alternate examples, however, the storage assembly 10 may include a stop or the like that can inhibit, such as prevent, the fastening material 14 from completely retracting within the storage housing 12, such that a portion of the second end 20 always extends a distance outwards from the storage housing 12. In addition to the hook, another stop may also be coupled to the fastening material 14. In yet another example, the biasing member 50 can be designed such that when the fastening material 14 is fully wound onto the spool, a portion of the second end 20 always extends a distance outwards from the storage housing 12. For example, the biasing member 50 may exert little or no force upon the fastening material 14 when at a fully retracted position.

In addition or alternatively, the storage assembly 10 may include a manual retraction mechanism for retracting the fastening material 14 into the storage housing 12. This may include one or more handle(s), or the like, adapted to manually wind the fastening material 14 onto the spool 32.

Figure 8:
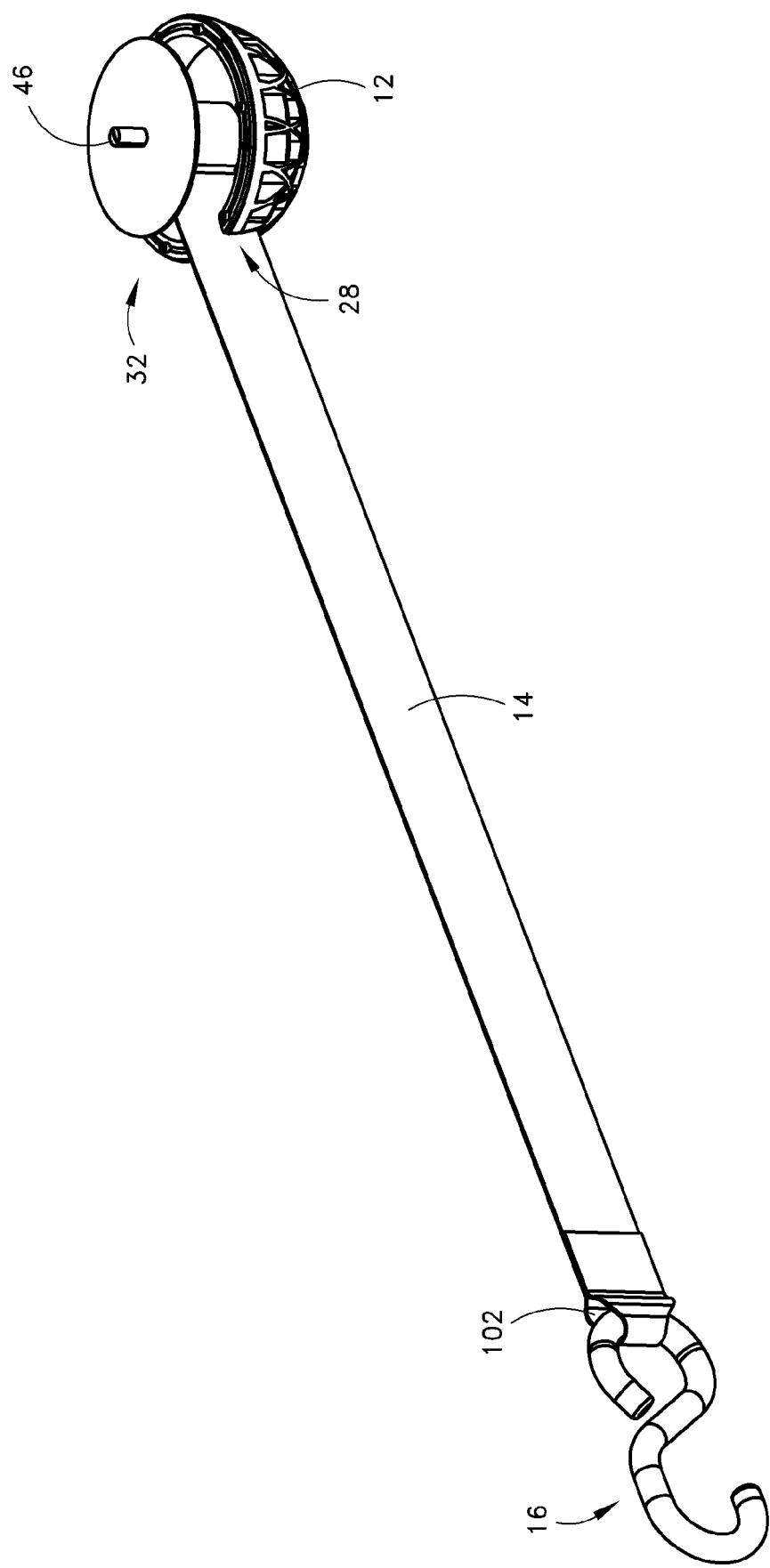
FIG. 8 is a perspective view of the embodiment of the invention shown in FIG. 5 with the fastening material fully unwound from the spool in a fully extended position.

As shown in FIGS. 7 and 8, the fastening material 14 is shown in a fully retracted position and a fully extended position respectively without the opposing half of the storage housing 12. In the fully retracted position of FIG. 7, the fastening material 14 is fully wound around the axle 40 onto the spool 32 with the loop engaging the attachment means. In the fully extended position of FIG. 8, little to no fastening material 14 remains wound onto the spool 32.

Figure 9:
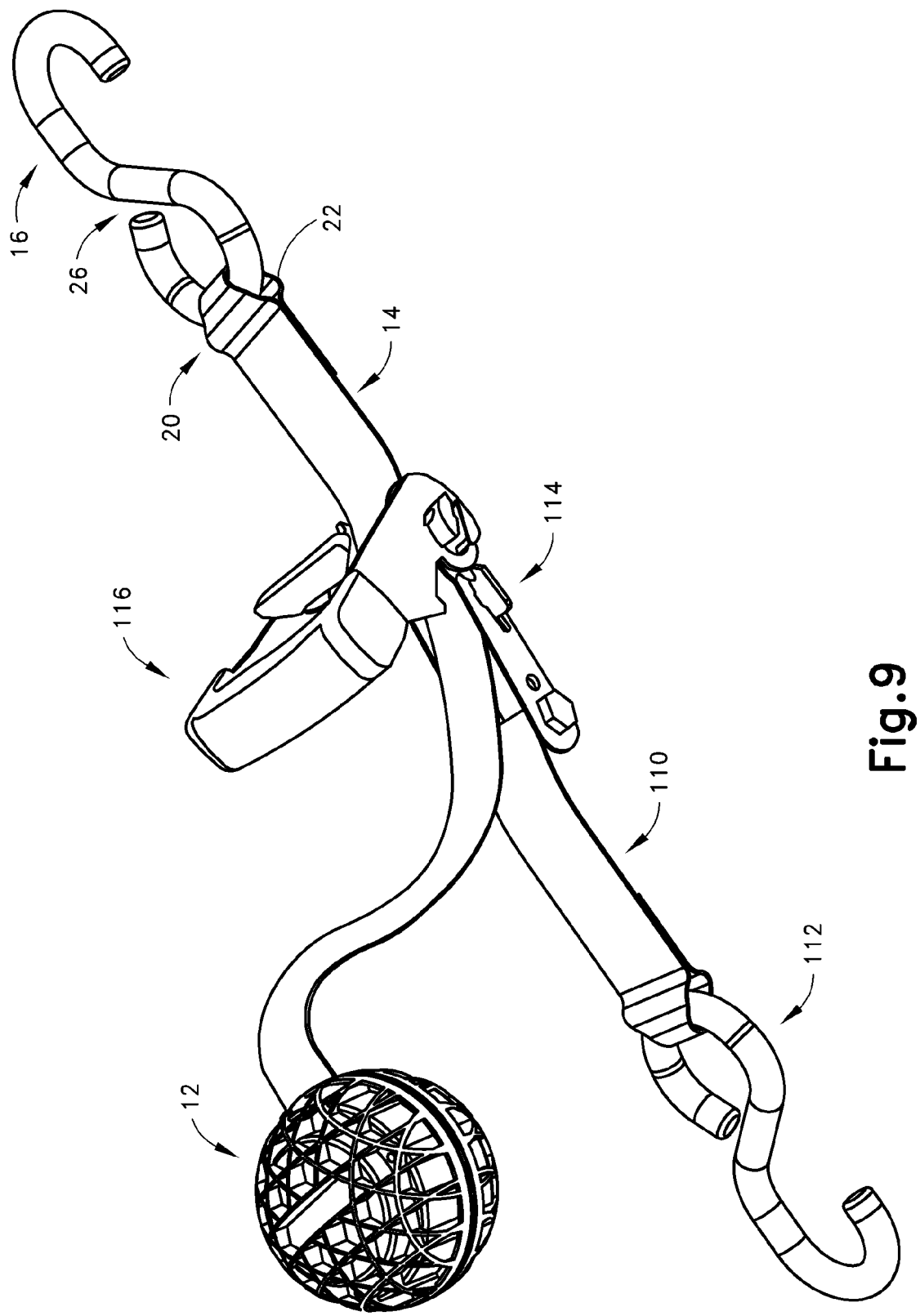
FIG. 9 is a perspective view of the embodiment of the invention with the storage assembly engaging with a ratchet/handle mechanism.

Based on the foregoing description, it will be understood that the storage assembly 10 is part of a ratchet arrangement used to secure an item. The overall ratchet assembly is illustrated in FIG. 9 and functions as follows. FIG. 9 shows a typical ratcheting device/tie-down assembly. The attachment means 16 and the hook 12 are attached to items (e.g., a vehicle item and a cargo item). The tie down assembly may comprise a ratcheting/handle mechanism 116 movably attached to a tie-down buckle 114. In an example use, the attachment means 16 can be removed from the loop end 22 of the fastening material 14. The loop end 22 of the fastening material 14 may then be fed through the ratchet axle/cambuckle/tie-down buckle 114. Next, the loop end 22 may be re-coupled to the attachment means 16 by sliding the loop end 22 through the slot 26 in the hook. A user can then extend the fastening material from the storage housing 12 by a pulling action and can secure the attachment means 16 to a tie-down point and/or an item or object to be secured. The attachment means 16 may be hooked at the end opposite the loop end 22, such that the attachment means 16 is fixed to an object. Similarly, a length of static webbing 110 of the tie-down buckle 114 can also be secured to a tie-down point and/or an item to be secured. The static webbing 110 may include a first end attached to a hook 112 and a second end attached to the tie-down buckle 114. The hook 112 may be secured to another object. Conversely, the second end of the static webbing 110 may be directly attached to the object. Next, with both the attachment means 16 and hook 112 secured in place, the user can utilize the ratchet/handle mechanism 116 to retract the fastening material 14 and apply tension to both the fastening material 14 and static webbing 110 to tighten the assembly and secure the load.

During the tightening process, excess fastening material 14 is disposed of on the side of the storage housing 12 side. Thus, during the tightening process, the amount of fastening material 14 is decreased between the attachment means 16 and tie-down buckle 114 but increased between the storage housing 12 and tie-down buckle 114. This excess fastening material 14 may be automatically retracted into the storage housing 12. As described above, the biasing member 50 and spring 54 provide a biasing force causing excess fastening material 14 to be wound onto the spool 32. Thus, the biasing member 50 and spring 54 retract the excess fastening material 14 and wind the fastening material 14 onto the spool 32. Consequently, after the retraction, there is little or no excess fastening material 14 between the storage housing 12 and the ratchet/handle mechanism 116. The storage housing 12 may then rest in close proximity to the tie-down buckle 114 and ratchet/handle mechanism 116. Therefore, the storage housing 12 retracts excess fastening material 14 into the storage housing 12 independent of the tie down assembly, static webbing 110, tie-down buckle 114, and/or ratchet/handle mechanism 116.

In addition or alternatively, the storage housing 12 can be removably coupled to a portion of the tie down buckle 114 or static webbing 110 such that unwanted movement of the storage housing 12 is prevented. In one example, a hook-and-loop style (i.e., Velcro) straps can be added to the exterior of the storage housing 12 to secure the storage housing 12 to the static webbing 110 after cargo has been tied down. The "Velcro" straps would attach on each side of the storage housing 12 and have the ability to be wrapped underneath the storage housing 12 and the static webbing 110 to secure them together. In yet another example, the storage housing 12 can include a tunnel extending therethrough, such as a tunnel molded into a portion of the storage housing 12. The hook 112 and static webbing 110 could extend through the tunnel, coupling the storage housing 12 together. Any of the various attachment examples can be used together, and/or can similarly apply to couple multiple storage assemblies 10 of the present invention to other portions of the ratchet/handle mechanism.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A ratchet arrangement including storage for storing a length of material, the ratchet arrangement including:
   a length of fastening material having a first end and a second end;
   at least one attachment means for attachment between the fastening material and an item to be secured;
   a ratchet actuatable for tightening the fastening material; and
   a storage assembly, separate from the ratchet and displaceable relative to the ratchet and displaceable over a variable distance from the ratchet, for storing a length of the fastening material, the assembly including:
   a storage housing having an internal cavity, the storage housing having an opening between the internal cavity and an exterior of the storage housing;
   a spool mounted within the internal cavity of the storage housing;
   a biasing member mounted within the internal cavity of the storage housing and operatively attached to the spool; and
   the fastening material being attached at the spool, the fastening material extending through the opening in the storage housing, the fastening material being adapted to be unwound from the spool when the spool is rotated in a first direction and wound onto the spool when the spool is rotated in a second direction opposite to the first direction, the biasing member adapted to bias the spool in the second direction; wherein rotation of the spool in the first direction causes the fastening material to extend from the opening.

2. The ratchet arrangement of claim 1, wherein the fastening material is automatically retracted into the storage housing.

3. The ratchet arrangement of claim 1, wherein the at least one attachment means comprises a hook.

4. The ratchet arrangement of claim 1, wherein the storage assembly is removably securable to the fastening material at a variable distance from the ratchet.

5. The ratchet arrangement of claim 4, wherein the storage assembly is also removably securable to the ratchet.

6. The ratchet arrangement of claim 1, wherein the storage assembly is spherical in shape.

7. The ratchet arrangement of claim 1, wherein the storage assembly includes a material having a relatively low durometer value.

8. A ratchet arrangement including storage for storing a length of material, the ratchet arrangement including:
   a tie-down assembly having a ratcheting mechanism and a buckle, the ratcheting mechanism movably attached to the buckle;
   a length of webbing having a first end and a second end, the webbing being attached adjacent its first end at an object and adapted to be secured adjacent its second end at the buckle;
   a storage housing separate from the tie-down assembly and able to be spaced a varying distance from the tie-down assembly, the storage housing having a biasing member mounted within an interior of the storage housing;
   a fastening material having a first end and a second end, the first end of the fastening material being attached within the storage housing, the second end of the fastening material extending through the ratcheting mechanism and the buckle; wherein
   the biasing member retracts the fastening material into the storage housing.

9. The ratchet arrangement of claim 8, wherein the storage housing further includes a spool mounted within the storage housing and operatively attached to the biasing member.

10. The ratchet arrangement of claim 9, wherein the fastening material is adapted to be unwound from the spool when the spool is rotated in a first direction and wound onto the spool when the spool is rotated in a second direction opposite to the first direction.

11. The ratchet arrangement of claim 10, wherein the biasing member adapted to bias the spool in the second direction.

12. The ratchet arrangement of claim 8, wherein the fastening material is retracted into the storage housing independent of a function of the tie-down assembly, ratcheting mechanism, buckle, and length of webbing.

13. The ratchet arrangement of claim 8, wherein the storage housing is removably securable to the fastening material at a variable distance from the ratchet.

14. The ratchet arrangement of claim 13, wherein the storage housing is also removably securable to the ratchet.

15. The ratchet arrangement of claim 8, wherein the storage housing is spherical in shape.

16. The ratchet arrangement of claim 8, wherein the storage housing includes a material having a relatively low durometer value.

* * * * *